United States Patent Office 3,330,656
Patented July 11, 1967

3,330,656
NOVEL PHOTOGRAPHIC PRODUCTS AND
PROCESSES
Norman W. Schuler, Lexington, Mass., assignor to Polaroid Corporation, Cambridge, Mass., a corporation of Delaware
No Drawing. Filed Aug. 14, 1963, Ser. No. 301,958
12 Claims. (Cl. 96—29)

This invention relates to novel monomers and polymers and particularly to novel monomers and polymers that absorb ultraviolet radiation.

One object of this invention is to provide novel monomers and polymers which absorb ultraviolet radiation.

Another object of this invention is to provide novel processes for preparing said novel monomers and polymers.

Another object of this invention is to provide novel photographic products for color diffusion transfer processes which embody means for protecting the transfer image from the deleterious effects of sunlight.

Another object is to provide novel photographic processes which produce color transfer images which have enhanced resistance to sunlight.

Other objects of the invention will in part be obvious and will in part appear hereinafter.

The invention accordingly comprises the process involving the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

It has been found desirable to protect materials sensitive to ultraviolet light, e.g., photographic color images, with a protective material which will absorb the harmful ultraviolet radiation but which will transmit radiation of other wavelengths. By applying the protective layer in the form of a polymer, several advantages may be realized. For example, the application of the protective layer will be easier, the desired degree of ultraviolet absorption can be readily controlled by the thickness of the polymer layer or by the concentration of the ultraviolet absorbing groups in the polymer, the ultraviolet absorber will not migrate on the surface but will provide a stable, continuous coating, and a glossy coating and/or a physically protective coating may also be provided.

The novel monomers of the present invention are compounds of the formula:

(A)

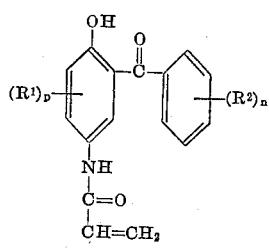

wherein $R^1$ and $R^2$ each may be halogen, alkoxy, hydroxy, aryl, such as phenyl, and alkyl, preferably lower alkyl, such as methyl or ethyl, and $n$ is 0, 1, 2 or 3 and $p$ is 0, 1 or 2.

It should be noted that the composition of $R^1$ or $R^2$ or the presence or absence of such groups is not critical to the preparation or utilization of the novel monomers and polymers of the present invention.

However, it should be understood that in polymers prepared from the monomers of Formula A, the presence of the various substituents set forth above may tend to alter the spectral characteristics in some respects, such as shifting the absorption peak to some degree. The selection of a monomer having a particular substituent should be considered, therefore, keeping in mind the purpose to which the polymer is going to be put. It should be further understood that none of the various substituents (designated $R^1$ and $R^2$) on the polymers render them non-absorptive in the ultraviolet region.

The novel monomers of this invention may be prepared by sulfonating a compound of the formula:

(B)

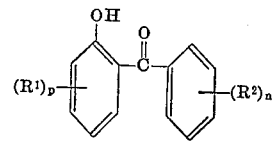

wherein $R^1$, $R^2$, $p$ and $n$ have the same meaning as above, converting the sulfonate group to a nitro group, reducing the nitro group to an amine group and converting the amine to an acrylamide.

It should be understood that certain benzophenone-type compounds may already possess a —$SO_3H$ substituent. It is obviously unnecessary to sulfonate such compounds and the first step of the reaction, therefore, would be to convert the sulfonate group to a nitro group and proceed as above. The —$SO_3H$ group may be introduced into compounds within Formula B by methods well known to the art, e.g., by treating a compound within Formula B with sulfuric acid.

The sulfonated benzophenone compounds may be reacted with nitric acid, to convert the sulfonate group to the nitro derivative. The nitro derivative is then reduced to the amine, by a Raney nickel reaction, for example. Reacting the thus-formed amine-substituted benzophenone compound with acrylyl chloride provides the novel monomers within Formula A of the present invention.

As examples of suitable benzophenone-type compounds within Formula B, mention may be made of:

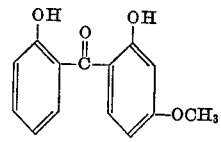

(1) 2,2'-dihydroxy-4-methoxybenzophenone

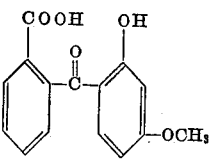

(2) 2-hydroxy-4-methoxy-2'-carboxybenzophenone

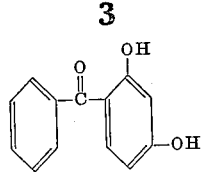
(3) 2,4-dihydroxybenzophenone

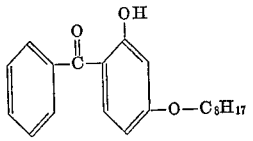
(4) 2-hydroxy-4-n-octoxybenzophenone

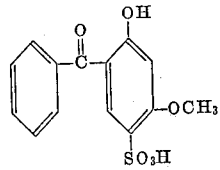
(5) 2-hydroxy-4-methoxy-5-sulfobenzophenone

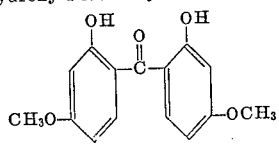
(6) 2,2'-dihydroxy-4,4'-dimethoxybenzophenone

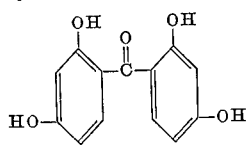
(7) 2,2',4,4'-tetrahydroxybenzophenone

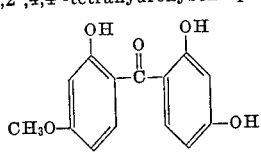
(8) 2,2'-4-trihydroxy-4'-methoxybenzophenone

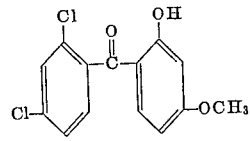
(9) 2-hydroxy-4-methoxy-2',4'-dichlorobenzophenone

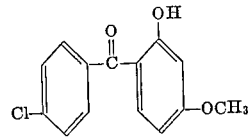
(10) 2-hydroxy-4-methoxy-4'-chlorobenzophenone

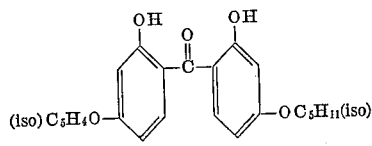
(11) 2,2'-dihydroxy-4,4'-di-(iso)-pentoxybenzophenone

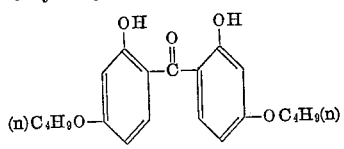
(12) 2,2'-dihydroxy-4,4'-di-(n)-butoxybenzophenone

The following nonlimiting example illustrates the preparation of the novel monomers within the scope of this invention.

*Example 1*

10 gm. of 2-hydroxy-4-methoxy-5-sulfobenzophenone (sold under the trade name Uvinul MS–40 by Antara Chemicals, 345 Hudson St., New York, N.Y.) was dissolved in 22 ml. of concentrated nitric acid. The mixture was then poured onto ice containing a stoichiometric amount of concentrated ammonium hydroxide. The product, 2-hydroxy-4-methoxy-5-nitro-benzophenone, was filtered off and washed with water.

10 gm. of 2-hydroxy-4-methoxy-5-nitrobenzophenone was partly dissolved in 40 ml. of cyclohexene. 0.5 gm. of 10% palladium-on-carbon wetted with benzene was carefully added to the mixture. The mixture was then heated at reflux (85–90° C.) overnight. The palladium catalyst was filtered off and 2-hydroxy-4-methoxy-4-amino-benzophenone melting at 98° C. crystallized out of the cyclohexene-benzene mixture.

1.8 gm. of 2-hydroxy-4-methoxy-5-amino-benzophenone was dissolved in 5 ml. of chloroform containing 1 gm. of sodium bicarbonate. 1 gm. of acrylyl chloride in 3 ml. of chloroform was added dropwise with stirring to the solution while maintaining the solution at 25° C. The solution was then stirred at room temperature for 1 hour, filtered, and the filtrate extracted twice with 5 ml. of saturated sodium bicarbonate solution. The chloroform solution was then dried with magnesium sulfate and allowed to stand in an open beaker until the monomer, 2-hydroxy-4-methoxy-5-acrylamido-benzophenone, crystallized. The monomer, melting at 147° C., was recrystallized from ethanol and showed the following analysis for $C_{17}H_{14}N$:

Calculated: C, 68.6; N, 4.7. Found: C, 68.4; N, 4.7.

The novel monomers of this invention may be copolymerized with a variety of monomers which contain at least one ethylenically unsaturated group. Such comonomers may be selected from those known to the art to copolymerize with acrylamides. As examples of such monomers, mention may be made of styrene, vinyl pyridines, acrylates, and acrylamides.

The preferred monomers which may be used to form novel copolymers with the novel monomers of the present invention are monomers which have a relatively low Q, or monomer reactivity, value, and a negative charge on the double bond. Another class of monomers are those which have a relatively high Q value and a positive charge on the double bond. The least desirable monomers are those which possess a low Q value and either a positive or negative charge on the double bond. The above-described method for the selection of monomers to form copolymers by reaction with the novel monomers of the present invention is in accordance with the Alfrey-Price scheme of describing monomer reactivity (J. Polymer Sci. 2, 101 [1947]).

In a preferred embodiment, the novel monomers of this invention are copolymerized with compounds of the formula:

(C) 

or (D) 

wherein X, Y, M and Z are hydrogen or alkyl radicals, to form novel ultraviolet light-absorbing polymers. The term "alkyl" is intended to include substituted alkyl radicals, e.g., alkyl radicals substituted by halogen and nitrogen atoms.

As examples of suitable comonomers within Formulas C and D, mention may be made of the following:

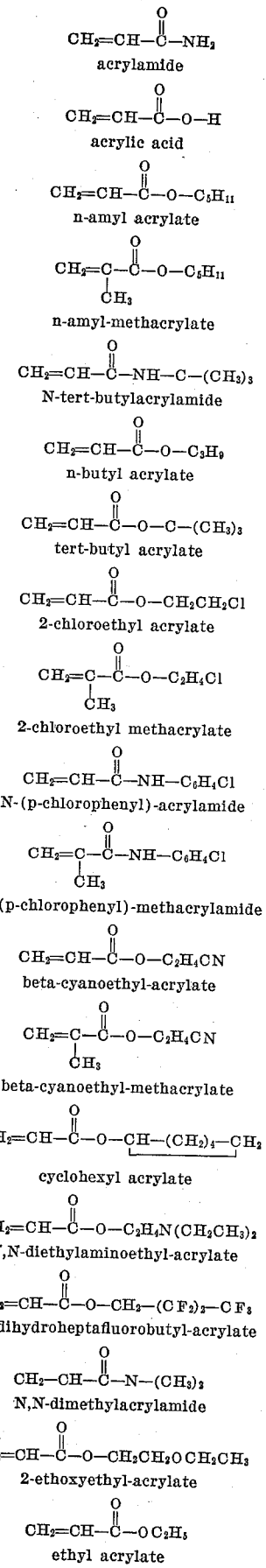

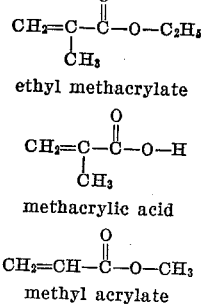

ethyl methacrylate $$CH_2=C-C-O-H$$
$$\quad \ \ |$$
$$\quad \ \ CH_3$$

methacrylic acid $$CH_2=CH-C-O-CH_3$$

methyl acrylate

The following nonlimiting example illustrates the preparation of novel polymers within the scope of the present invention.

*Example 2*

0.5 gm. of 2-hydroxy-4-methoxy-5-acrylamido-benzophenone and 0.5 gm. of acrylic acid was dissolved in 5 ml. of ethanol containing 0.4% azobisisobutyronitrile. The solution was heated at 65° C. under vacuum for 24 hours. The resulting viscous solution was diluted with ethanol and the 2-hydroxy-4-methoxy-5-acrylamido-benzophenone/acrylic acid copolymer was precipitated into benzene. The pale yellow copolymer was reprecipitated twice from ethanol into benzene and dried.

Additional ultraviolet light absorbing copolymers may be prepared by copolymerizing other suitable comonomers with the novel monomer of the present invention in an analogous manner.

The novel ultraviolet light-absorbing polymers are particularly useful in providing protection from the deleterious effects of sunlight to color prints formed by color diffusion transfer processes.

In such processes, a photosensitive element including a silver halide emulsion layer is exposed and the exposed photosensitive element is developed and, concurrent with and under the control of this development, an imagewise distribution of mobile organic color-providing substances is formed. At least a portion of these color-providing substances is transferred to a superposed image-receiving stratum to form a colored image thereon. As examples of such processes, mention may be made of the processes disclosed and claimed in U.S. Patent No. 2,983,606, issued May 9, 1961, to Howard G. Rogers, wherein dye developers (i.e., compounds which contain in the same molecule both the chromophoric system of a dye and also a silver halide developing function) are the color-providing substances; the processes claimed and disclosed in U.S. Patent No. 2,647,049, issued July 28, 1953, to Edwin H. Land, wherein color developers are employed to develop the latent image and color couplers are the color-providing substances; and the processes disclosed in U.S. Patent No. 2,774,668, issued Dec. 18, 1956, to Howard G. Rogers, wherein complete, preformed dyes are used as the color-providing substances; and the color processes employing screen-type negatives disclosed and claimed in U.S. Patent No. 2,968,554, issued Jan. 17, 1961, to Edwin H. Land. By the term "organic color-providing substances," as used herein, is meant dyes, including dye developers, and dye intermediates, e.g., color couplers.

In an especially useful mode of carrying out color diffusion transfer processes such as described above, the color-providing substances are disposed in a separate alkali-permeable layer in the photosensitive element. The separate alkali-permeable layer may be placed either in front of or behind the photosensitive emulsion with which it is associated; however, in a preferred embodiment it is placed behind, i.e., on the side of the emulsion which is most distant from the photographed subject when the emulsion is exposed, and preferably also adapted to be most distant from the image-receiving element when in superposed relationship therewith. In carrying out the processes, the photosensitive element is exposed and wetted with a processing composition, for example, by immersing, coating, spraying, flowing, etc., in the dark, and the photosensitive element is superposed, prior to, during or after wetting, on an image-receiving element. In a preferred embodiment the processing composition contains a viscosity-increasing compound and is applied to the photosensitive element in a substantially uniform layer as the photosensitive element is brought into superposed position with the image-receiving element. The processing composition permeates the photosensitive emulsion and alkali-permeable layers and solubilizes the color-providing substances to provide a substantially uniform distribution of the color-providing substances therein. An imagewise distribution of mobile color-providing substances is formed in undeveloped areas as a function of development. At least a portion of the mobile color-providing substances is transferred to and imbibed on the dyeable stratum of the image-receiving element to form the transfer image. The image is viewed by stripping the image-receiving element from the photosensitive element.

The novel polymers of the present invention are preferably applied to the image-receiving element as a layer over the dyeable layer. Upon processing, the color-providing substances transfer through the polymeric ultraviolet light absorber and deposit on the dyeable layer behind the ultraviolet light-absorbing polymeric layer. The layer of polymeric ultraviolet light absorber should not be applied to the image-receiving layer in a manner which might tend to inhibit the transfer of color-providing substances and thus decrease the density of the colors on the positive print. Preferably, the polymeric ultraviolet light absorber is applied to the image-receiving layers from a suitable solvent, e.g., methanol or ethanol. It may also be desirable to add another polymer such as cellulose acetate hydrogen phthalate to the solution of polymeric ultraviolet light absorber prior to coating to act as a carrier for said polymeric ultraviolet light asborber and thereby provide for greater ease of application.

The image-receiving elements, which are overcoated with the novel ultraviolet light absorbing polymer, generally comprise a sheet of dyeable material, e.g., baryta. In a preferred embodiment, such elements comprise a support which in turn has been coated with an image-receiving stratum of a dyeable material. As examples of dyeable materials which have been found useful for the image-receiving stratum, mention may be made of gelatin, a mixture of polyvinyl alcohol and polyvinyl pyrrolidone, copolymers of vinyl alcohol and vinyl pyrrolidone, and nylons (linear polyamides) such as N-methoxymethyl polyhexamethylene adipamide. The image-receiving sheet which comprises a layer of polyvinyl alcohol and poly-4-vinyl pyridine on a support, disclosed and claimed in the copending application of Howard C. Haas, Ser. No. 50,848, filed Aug. 22, 1960, now Patent No. 3,148,061, has been found to be particularly useful. The novel method of this invention for protecting color images has also been found to be particularly useful when used with the image-receiving elements set forth in the copending application of Edwin H. Land, Ser. No. 234,864, filed Nov. 1, 1962, wherein the image-receiving element contains a layer of a polymeric acid.

The products and processes of this invention are especially useful when dye developers are the color-providing substances. Dye developers, as noted above, are compounds which contain in the same molecule both the chromophoric system of a dye and also a silver halide developing function. By "a silver halide developing function" is meant a radical which is capable of developing an exposed silver halide image. In a preferred embodiment, the silver halide developing function in such compounds is provided by the presence of a benzenoid developing radical therein, e.g., a hydroquinonyl radical. Examples of representative dye developers are given in the previously mentioned U.S. Patent No. 2,983,606.

In color diffusion transfer processes employing dye developers, the dye developer, as mentioned previously for color-providing substances, in general, is preferably placed in a separate alkali-permeable layer behind the photosensitive layer. Upon processing, the processing composition permeates to the separate alkali-permeable layer and solubilizes the dye developer therefrom. As the process proceeds, the latent silver halide image in the photosensitive element is developed and, as a result of this development, the dye developer in the exposed areas is oxidized and substantially immobilized. At least a portion of the unreacted dye developer is imbibed on a superposed image-receiving element to create thereon the positive dye image. In such processes, the immobilization of the dye developers in the exposed areas is apparently due, at least in part, to a change in the solubility characteristics of the dye developer upon oxidation. It may also be due in part to a tanning effect on the emulsion by the oxidized developer and to localized exhaustion of alkali due to development.

The liquid processing compositions suitable for use in this invention may also contain, as well as an alkaline material, e.g., sodium hydroxide, cesium hydroxide or potassium hydroxide, a dye developer, and, in some instances may also contain an additional silver halide developing agent. A viscosity-increasing compound constituting a film-forming material may also be added to facilitate spreading. A preferred film-forming material is a high molecular weight polymer, such as a polymeric, water-soluble ether inert to an alkali solution, as, for example, a hydroxyethyl cellulose or sodium carboxymethyl cellulose. The film-forming materials or thickening agents whose ability to increase viscosity is substantially unaffected when left in solution for a long period of time may also be used. The liquid processing composition may also contain antifoggants, e.g., benzotriazole, and quaternary ammonium compounds, e.g., N-phenethyl-α-picolinium bromide, N-benzyl-α-picolinium bromide, as disclosed in the copending application of Milton Green and Howard G. Rogers, Ser. No. 50,851, filed Aug. 22, 1960, now Patent No. 3,173,786.

The novel ultraviolet light-absorbing polymers of this invention were tested in diffusion transfer processes on multilayer photosensitive elements prepared in the manner similar to that disclosed in the above-mentioned U.S. Patent No. 2,983,606 and in the above-mentioned copending application of Edwin H. Land and Howard G. Rogers, Ser. No. 565,135, filed Feb. 13, 1956, and image-receiving elements which comprise a layer of polyvinyl alcohol and poly-4-vinyl pyridine on a support and a layer of a polymeric acid, prepared in the manner similar to that disclosed and claimed in the above-mentioned copending applications of Howard C. Haas, Ser. No. 50,848, now Patent No. 3,148,061, and Edwin H. Land, Ser. No. 234,864.

The liquid processing composition used in these tests comprised an aqueous solution containing:

|   | Percent |
|---|---|
| Potassium hydroxide | 11.2 |
| Hydroxyethyl cellulose | 4.5 |
| Benzotriazole | 2.3 |
| N-benzyl-α-picolinium bromide | 2.3 |
| Sodium thiosulfate | 1.15 |

In the examples set forth below, reference to a multicolor negative is to a multilayer negative in which the blue-sensitive, green-sensitive, and red-sensitive silver iodobromide emulsion layers have positioned behind them, respectively, a yellow dye developer, a magenta dye developer, and a cyan dye developer. A gelatin interlayer is positioned between the yellow dye developer layer and the green-sensitive emulsion, and between the magenta dye developer and the red-sensitive emulsion. Multilayer negatives of this type are disclosed, for example, in FIG. 9 of the previously mentioned U.S. Patent No. 2,983,606. The dye developer layers are prepared by dissolving each dye developer in a water-immiscible solvent and dispersing the resulting solution in gelatin. The particular dye developers employed were— cyan:

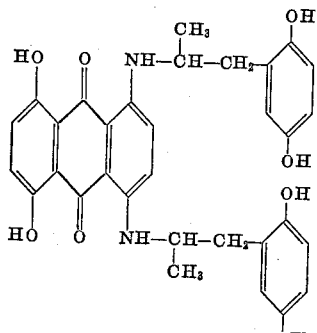

1,4-bis-[α-methyl-β-hydroquinonyl-ethylamino]-5,8-dihydroxy-anthraquinone magenta:

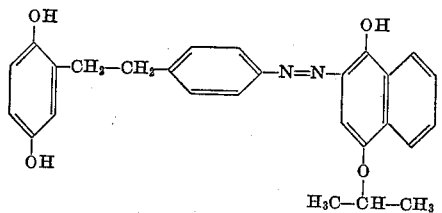

2-[p-(2′,5′-dihydroxyphenethyl)-phenylazo]-4-isopropoxy-1-naphthol yellow:

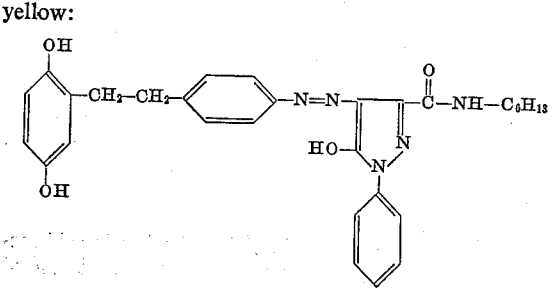

1-phenyl-3-N-n-hexylcarbamyl-4-[p-(2′,5′-dihydroxyphenethyl)-phenylazo]-5-pyrazolone The effectiveness of the novel polymers of this invention in providing protection to color images was measured by exposing a multilayer, multicolor negative as described above, and by spreading a thin layer of the previously mentioned processing composition between the above-mentioned image-receiving element and said exposed multicolor negative as they were brought into superposed relationship. After an imbibition period of 1 minute, the image-receiving element was separated from the negative. The positive image was then subjected to accelerated fading tests along with control positive prints, i.e., images formed on comparable image-receiving elements not overcoated with ultraviolet light absorbing polymers.

The accelerated fading tests may be described as follows: The positive color prints under test were mounted under glass, and positioned three inches from the glass, the glass being positioned at an angle of 45° to the horizontal and facing South. In this manner, the prints were exposed on the Florida seacoast on a 24 hour basis for the period necessary to record the desired number of gram-calories per square centimeter (Langleys) of solar radiation, as recorded by an Epply Pyrheliometer (made by the Epply Laboratory, Inc., Newport, R.I.) as the sensing unit. An evaluation of the effectiveness was then made by comparing the degree of magenta fading of a control sample with one that had been protected by ultraviolet light absorbers applied from the processing compositions.

It was found that the magenta component of the color image formed on an image-receiving element to which one coating of 2% ethanol solution of the polymer of Example 2 had been applied prior to formation of the image, faded 14% after exposure to 700 Langleys, and 23% after 1400 Langleys. The magenta component of a color image to which two coatings of a 2% ethanol solution of the polymer of Example 2 had been applied prior to formation of the image faded 10% after exposure to 700 Langleys and 17% after exposure to 1400 Langleys. The above results should be compared with a control sample with no ultraviolet light-absorbing polymer coating which faded 20% after exposure to 700 Langleys and 34% after 1400 Langleys.

It can be readily seen therefore that a substantial degree of protection can be provided to color images by means of the present invention by dissipating the absorbed energy and decreasing the tendency to fade or discolor, even when the color images are subjected to such an intensive and severe test as the above-described sunlight exposure test.

Since certain changes may be made in the above product and process without departing from the scope of the invention herein involved, it is intended that all matter contained in the above description shall be interpreted as illustrative and not in a limiting sense.

What is claimed is:

1. A photographic product for a color diffusion transfer process comprising (A) a photosensitive element, including a silver halide emulsion, having disposed therein color-providing substances selected from the group consisting of dyes and dye intermediates, said color-providing substances being adapted to form an imagewise distribution of mobile color-providing substances as a function of development of the silver halide emulsion, (B) an image-receiving element, said image-receiving element bearing in turn a support, a dyeable image-receiving stratum and a layer of an alkali-permeable polymeric ultraviolet light absorber comprising the reaction product of the copolymerization of a first monomer of the formula:

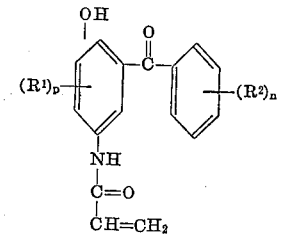

wherein $R^1$ and $R^2$ each are selected from the group consisting of halogen, alkoxy, hydroxy, aryl and alkyl radicals, $n$ is an integer from 0 to 3, inclusive, and $p$ is an integer from 0 to 2, inclusive, and at least a second monomer containing at least one ethylenically unsaturated group, and (C) a rupturable container holding a liquid processing composition, said elements being capable of being superposed, and said container being associated with said elements in such a manner that the container, upon being ruptured, is capable of releasing said processing composition between said superposed elements.

2. A product as defined in claim 1 wherein said second monomer is selected from the group consisting of compounds of the formulae:

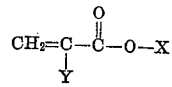

and

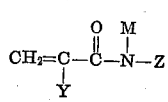

wherein X, Y, M and Z each are selected from the group consisting of hydrogen and alkyl radicals.

3. A product as defined in claim 1 wherein said polymeric ultraviolet light absorber is a 2-hydroxy-4-methoxy-5-acrylamidobenzophenone/acrylic acid copolymer.

4. The process which comprises the steps of permeating an exposed photosensitive element, including a silver halide emulsion, with an alkaline liquid processing composition, developing said exposed emulsion and forming an imagewise distribution of an unoxidized dye developer, and transferring at least a portion of said unoxidized dye developer to a superposed image-receiving element, said image-receiving element containing a layer adapted to provide a visible dye image upon transfer to said layer of a diffusible dye image-forming substance and, superposed over said layer, an alkali-permeable polymeric ultraviolet light absorber comprising the reaction product of a compound of the formula:

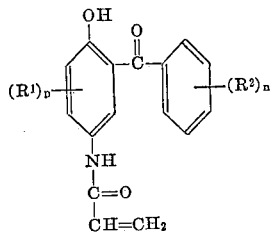

wherein $R^1$ and $R^2$ each are selected from the group consisting of halogen, alkoxy, hydroxy, aryl, and alkyl radicals, $n$ is an integer from 0 to 3, inclusive, and $p$ is an integer from 0 to 2, inclusive, and at least a second monomer containing at least one ethylenically unsaturated group.

5. A process as defined in claim 4 wherein said second monomer is selected from the group consisting of compounds of the formulae:

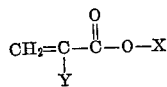

and

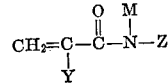

wherein X, Y, M and Z each are selected from the group consisting of hydrogen and alkyl radicals.

6. A process as defined in claim 4 wherein said polymeric ultraviolet light absorber is a 2-hydroxy-4-methoxy-5-acrylamidobenzophenone/acrylic acid copolymer.

7. In a process of forming a color image by diffusion transfer, wherein an imagewise distribution of a dye image-providing substance selected from the group consisting of image dyes and intermediates for said image dyes is transferred by means of an alkaline processing composition from a developed photosensitive stratum to a superposed image-receiving stratum, the step which comprises overcoating said image-receiving stratum, prior to the transfer of said dye image, in a concentration effective to reduce fading of said image dye upon exposure to sunlight, with a layer of an alkali-permeable polymeric ultraviolet light absorber comprising the reaction product of a compound of the formula:

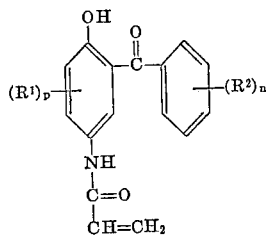

wherein $R^1$ and $R^2$ each are selected from the group consisting of halogen, alkoxy, hydroxy, aryl, and alkyl radicals, $n$ is an integer from 0 to 3, inclusive, and $p$ is an integer from 0 to 2, inclusive, and at least a second monomer containing at least one ethylenically unsaturated group; and transferring said image dyes through said polymeric ultraviolet light absorber to said image-receiving stratum.

8. A process as defined in claim 7 wherein said second monomer is selected from the group consisting of compounds of the formulae:

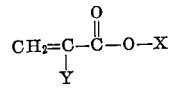

and

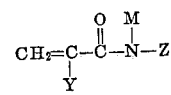

wherein X, Y, N and Z each are selected from the group consisting of hydrogen and alkyl radicals.

9. A process as defined in claim 7 wherein said polymeric ultraviolet light absorber is a 2-hydroxy-4-methoxy-5-acrylamidobenzophenone/acrylic acid copolymer.

10. As a novel product for color diffusion transfer processes, an image-receiving element, comprising, in sequence, a support, an image-receiving layer and a layer of an alkali-permeable polymeric ultraviolet light absorber comprising the reaction product of a compound of the formula:

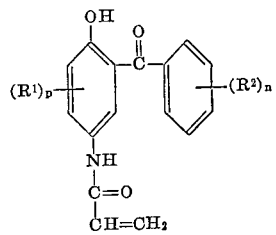

wherein $R^1$ and $R^2$ each are selected from the group consisting of halogen, alkoxy, hydroxy, aryl, and alkyl radicals, $n$ is an integer from 0 to 2, inclusive, and at least a second monomer containing at least one ethylenically unsaturated group.

11. A product as defined in claim 10 wherein said second monomer is selected from the group consisting of compounds of the formulae:

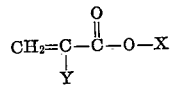

and

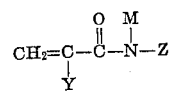

wherein X, Y, N and Z each are selected from the group consisting of hydrogen and alkyl radicals.

12. A product as defined in claim 10 wherein said polymeric ultraviolet light absorber is a 2-hydroxy-4-methoxy-5-acrylamidobenzophenone/acrylic acid copolymer.

References Cited

UNITED STATES PATENTS

| | | | |
|---|---|---|---|
| 3,069,262 | 12/1962 | Haas | 96—29 |
| 3,120,564 | 2/1964 | Milionis et al. | 260—562 |
| 3,249,435 | 5/1966 | Rogers | 96—29 |

FOREIGN PATENTS

| | | |
|---|---|---|
| 793,292 | 4/1958 | Great Britain. |

NORMAN G. TORCHIN, *Primary Examiner.*

J. TRAVIS BROWN, *Examiner.*

R. H. SMITH, *Assistant Examiner.*